Oct. 6, 1925.  
E. ANDERSON  
1,556,193  
METHOD AND APPARATUS FOR MAKING CERAMIC PRODUCTS  
Filed Nov. 19, 1924
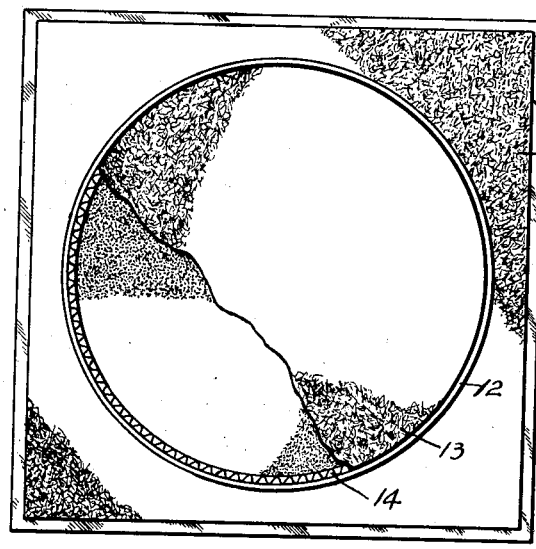
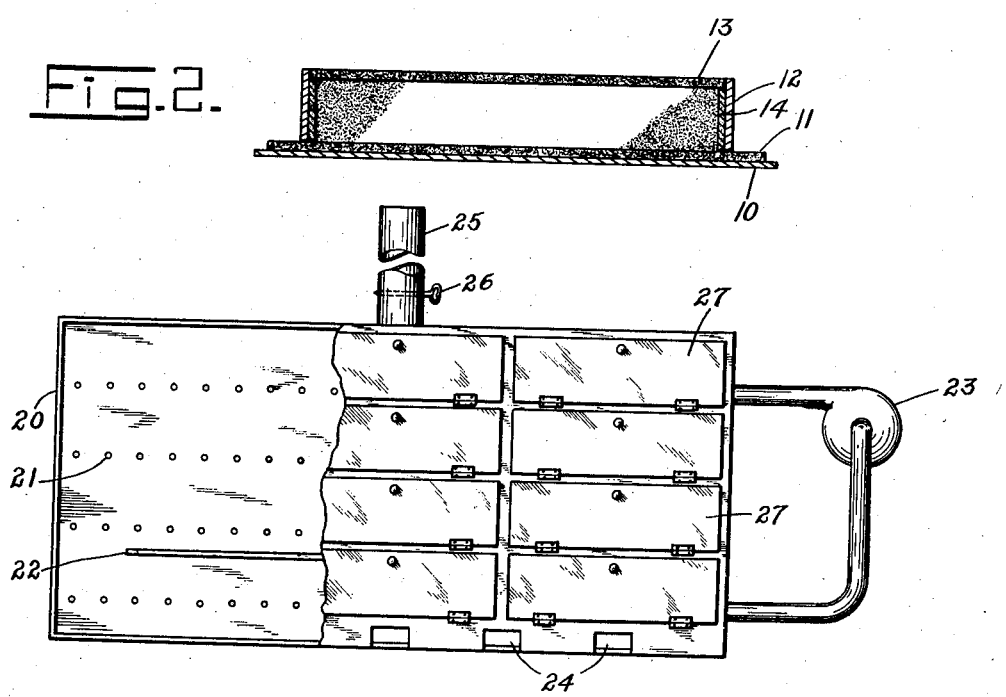
Inventor  
Edward Anderson,  
By F. K. Fassett,  
Attorney.

Patented Oct. 6, 1925.

1,556,193

UNITED STATES PATENT OFFICE.

EDWARD ANDERSON, OF DAYTON, OHIO, ASSIGNOR TO THE A. A. SIMONDS-DAYTON COMPANY, OF DAYTON, OHIO, A CORPORATION OF OHIO.

METHOD AND APPARATUS FOR MAKING CERAMIC PRODUCTS.

Application filed November 19, 1924. Serial No. 750,881.

*To all whom it may concern:*

Be it known that I, EDWARD ANDERSON, a citizen of the United States, residing at Dayton, in the county of Montgomery and State of Ohio, have invented a new and useful Method and Apparatus for Making Ceramic Products, of which the following is a specification.

This invention relates to the manufacture of ceramic products, and while it is applicable to other ceramic articles I shall describe it in connection with the making of abrasive, or what are commonly called emery wheels.

It has long been a custom to mix or "puddle" the constituents of abrasive wheels, that is, the granular abrasive material and bonding clay, with water, forming a semi-fluid mass of about the consistency of thick mortar, placing this mass, or "puddle", as it is called, in molds and drying out the water. When the contents of the molds, or wheels, as they may now be called, are dry, they are trimmed or "shaved" to nearly their final size and shape, after which they are placed in a kiln and heated to a degree sufficient to vitrify the bonding clay. The dry wheels, before they are fired, are very fragile and shattery, the bonding clay contributing very little to their strength in this transitory stage. Because of their fragility a percentage of wheels are damaged or destroyed in the handling or the various operations to which they are necessarily subjected before they are safely deposited in the kiln. Moreover, the care which must be exercised to keep this loss from being far greater consumes much of the time of the workers, with consequent increase in the cost of the product. All of this is true of wheels of various sizes, but it is especially so in the case of large wheels, and even of comparatively small wheels, where they are thin.

The principal object of my invention is to increase the strength of the wheels during this transitory period, thereby reducing the losses referred to, and reducing the cost of handling, which has heretofore been a very appreciable element in the whole cost of abrasive wheels. Several factors contribute to this result. First, I add to the puddle a quantity of boiled linseed oil, or some other binder, whereby to give the dried wheels more strength; second, I use an improved mold; third, I provide an improved oven for drying the "puddle", and fourth, I manage the drying process in a new and improved way.

I shall now describe my new method of making abrasive wheels and improved apparatus for carrying out my method, illustrating the description with the accompanying drawing in which, Fig. 1 is a plan view of my improved mold;

Fig. 2 is a side view of this mold, and

Fig. 3 is a view of the oven in which the wheels are dried.

My improved mold comprises a square metallic plate 10, upon which lies an absorbtive mat 11. While other materials may be used for this mat, I prefer the well known asbestos board, because of its absorbtive properties and its capacity for resisting heat. Upon this mat, which is also square, I lay a metal ring 12, which completes the mold for one wheel. To facilitate removing the wheel from the ring after it is dry I line the ring with a strip 14 of corrugated paper, such as is used extensively for packing breakable articles. This lining is not essential, but it is a convenience. Other materials may be used for this purpose, but the advantage of using the corrugated paper is that after the wheel is dry the corrugations can be easily crushed, leaving the wheel loose in the ring. After filling the mold I cover the "puddle" with a piece of asbestos board 13, similar to the mat, but cut circular so it can lie flat on the puddle, the upper surface of which may be below the edge of the ring. Thus the entire wheel is covered. Having filled the molds as described 1 deposit them in an oven.

This oven consists of a large chamber 20 with racks or skeleton shelves 21 for the support of the molds, while allowing free circulation of air in the oven. At 22 I provide a horizontal baffle, which extends from one end wall of the oven to near the other end. A fan 23 draws air from below the baffle and returns it to the oven above the baffle, without introducing any fresh air into the oven. Air inlets 24 are provided at the bottom of the oven, and a stack 25 at the top, the latter being provided with a damper 26 for closing the stack. The oven is fitted with a plurality of doors 27.

I prefer to deposit the molds in the oven when the latter is cold. The doors are then closed and the oven is heated slowly to a temperature of from 400 degrees to 450 degrees Fahrenheit. While the oven is being heated the damper in the stack is kept closed, and the air inlets 24 are closed, the latter being done by setting something in front of each opening. The fan 23 is operated while the oven is heating, but as only a small amount of fresh air enters the oven the air in the oven is made humid by evaporation of water. The asbestos mats 11 and covers 13 protect the "puddle" contained in the molds from direct action of the circulating air, but because of their absorbtivity they draw water from the "puddle" which evaporating produces the humidity referred to. The advantage of making the pallets 10 and mats 11 square, while the molds are circular, is that the four exposed corners of the mats serve as media for carrying water by capillarity from the wet puddle to the circulating air of the oven. The covers 13 also carry water up to their outer surfaces to be evaporated. If desired the lining of the ring may be made of material adapted to absorb water from the puddle. In fact, the corrugated paper above mentioned acts in this way to some extent. As the quantity of water contained in the "puddle" is very large compared with the capacity of the oven air for carrying moisture, the oven air attains a high percentage of humidity, while the quantity of water removed from the puddle is yet comparatively small. In other words, the wheels in the molds make but little progress in the matter of drying during this heating up period of the process. The object at this time is to heat the wheels slowly clear through while drying them but little. Thus the wheels are kept from cracking, and from other injury which might come about through too rapidly drying the outer parts of the wheels. Having raised the oven to the desired temperature, I open the inlets 24 and the damper 26. But the fan is kept running. Thus the natural draft of the stack is employed in bringing in fresh air, with consequent reduction in the humidity of the air in the oven, while the rapid horizontal air currents are maintained as before. With the lowered humidity in the oven air evaporation of water becomes more rapid, and it may even be very rapid now without injuring the wheels. One of the dangers in humidity drying is that the humidity of the oven or kiln atmosphere may be reduced too much and cause the very results which humidity drying is designed to prevent. Protecting the wheels from the direct action of the circulating air eliminates this danger. In effect, the wheels are in high humidity until they are practically dry, which prevents the outer parts drying faster than the inner parts. Localized humidity is a good way of expressing it. As water is drawn by the absorbtive investment from the surfaces of the "puddle," water is carried from the interior to the surface by capillarity. This distribution or equalization goes on until no water remains. After the water vaporizes the equalization continues. Without the protective media water drawn by capillarity from the interior to the upper surface of the "puddle" would be evaporated more quickly than the water could move from the interior to the surface, thus leaving the outside comparatively dry and the remainder wet, and causing unequal shrinkage. This weakens the mass and even starts cracks which render the product worthless. But with the covering media the drying is substantially uniform and no cracking or checking occurs. The covering keeps the surfaces of the "puddle" moist as long as any moisture remains in the "puddle." When the heat becomes great enough the water in the puddle vaporizes, but the complete investment of the "puddle" continues to protect and prevent unequal drying. In a word, the integrity of the wheels is preserved and this alone tends to reduce the losses I have previously described.

I have found linseed oil quite satisfactory as a temporary binder. The oil oxidizes and becomes hard, and drawing in between the points of contact of the grains of the abrasive substance in the mass it binds them together. The amount of oil needed is not exact, but I have obtained good results with two pounds of oil to one hundred pounds of other dry constituents. Too much oil makes the wheels so hard that the labor of "shaving" them is increased, while if too little oil is used the gain in strength is deficient. Other oils, such as China-wood oil and cottonseed oil may be used. Rosin may also be used, either powdered or dissolved in a suitable solvent. The temporary binder burns out when the wheels are fired in the kiln, so the wheels in their finished state are not affected thereby.

By the use of my method and apparatus the drying of wheels is effected in much less time than is possible by any method of which I am aware. The method of molding and drying wheels now in common use consists in molding the "puddle" in iron rings lying on a pallet made of plaster of paris or some other such porous material, the upper surface of the "puddle" being left uncovered. These molds are then exposed to the ordinary atmosphere for several days, after which they are placed in a drying room, where they remain in a temperature from 100 to 125 degrees Fahrenheit, requiring from one week to four weeks to dry according to the temperature and the size of the wheel. Drying them more rapidly with their tops exposed results in cracking or checking, because of their drying more rapidly on the surface than in the interior. By my method a 24″x5″ mass, for 24″x3″ finished wheel, is dried in twenty-four hours. I consume about six hours in raising the temperature to 400 degrees or 450 degrees, and then hold that temperature for about eighteen hours. I only limit my temperature to what the binder will stand, which with linseed oil is about 450 degrees Fahrenheit. A temperature above 212 degrees Fahrenheit will vaporize the water in the puddle, but the rapid drying spoken of above is done at a temperature above 400 degrees Fahrenheit. While it may be possible to use plaster pallets instead of metal plates and asbestos mats in my system, it is not practicable because the pallets can not stand the heat of the oven. Moreover, the plaster pallets take up too much room in the oven, being from two to three inches thick, where the thickness of my metal plate and asbestos mat combined is less than three quarters of an inch.

While I have described the preferred form of my invention and suggested a few modifications, I do not wish it understood that the invention is limited to the specific disclosure here made as equivalent substitutes for various elements thereof are to be considered as within the scope of the appended claims.

What I claim as my invention is as follows:

1. The method of making a ceramic article, which comprises puddling the constituents of the article, adding a quantity of temporary binding material, enclosing the puddle in a mold and depositing the mold in an oven, the temperature thereof being then raised to a point sufficiently high to cause the binding material to bind the constituents of the puddle together, and maintained thus until the puddle is dry, the puddle being subjected indirectly to air currents in the oven.

2. The method of making a ceramic article, which comprises puddling the constituents of the article, adding a quantity of temporary binding material, enclosing the puddle in a mold and depositing the mold in an oven, slowly raising the temperature therein sufficiently to act upon the binding material and cause it to give temporary strength to the article, maintaining the oven at such temperature until the puddle is dry, artificially circulating the air in the oven but admitting no new air until after the temperature in the oven has reached its maximum height, such portions of the puddle as are not covered by the mold being protected from direct action of the circulating air by absorbtive media.

3. The method of making a ceramic article, which comprises puddling the constituents of the article, adding sufficient linseed oil to strengthen the article to a desired degree, inclosing the puddle in a mold and depositing the mold in an oven, slowly raising the temperature therein sufficiently to harden the oil, maintaining the oven at such temperature until the puddle is dry, protecting portions of the puddle not protected by the walls of the mold from direct action of the oven air by absorbtive media.

4. The method of making a ceramic article, which comprises puddling the constituents thereof, and including a temporary binding substance whereby to strengthen the article in its transitory stages, putting the article in a mold and the mold into a cold oven, raising the temperature of the oven to a degree sufficient to act upon the temporary binder and cause it to bind the constituents of the puddle together, maintaining that temperature until the puddle is dry.

5. The method of making a ceramic article, which comprises puddling the constituents of the article, completely investing the puddle, part of the investment being adapted to give form to the puddle, and part of it to conduct water therefrom by capillarity, placing the invested puddle in an oven and raising the temperature thereof above 212 degrees Fahrenheit, maintaining it so until the puddle is dry.

6. The method of making a ceramic article, which comprises puddling the constituents of the article, completely investing the puddle, part of the investment giving form to the article and part of it being adapted to conduct water therefrom by capillarity, placing the invested puddle in an oven and raising the temperature thereof above 212 degrees Fahrenheit, maintaining it so and artificially circulating the air in the oven until the puddle is dry.

7. The method of making a ceramic article, which comprises puddling the constituents of the article, completely investing the puddle, part of the investment giving form to the article and part of it being adapted to conduct water therefrom by capillarity, placing the invested puddle in an oven and slowly raising the temperature thereof to above 212 degrees Fahrenheit, maintaining it so and artificially circulating the air in the oven, excluding fresh air until the maximum temperature and full humidity is attained, and then permitting a limited change of air.

8. The method of making a ceramic article, which comprises puddling the constituents of the article, completely investing the puddle, part of the investment giving form to the article and part of it being adapted to conduct water therefrom by capillarity, placing the invested puddle in an oven and slowly raising the temperature thereof to above 212 degrees Fahrenheit, while maintaining a horizontal current of air, continuing said currents after the maximum temperature is maintained, but also permitting gradual change of the oven air by gravity, while maintaining the high temperature of the oven.

9. In apparatus for drying the puddled constituents of abrasive wheels and the like, an absorbtive pallet, a ring lying thereon, into which the puddle is poured, and an absorbtive cover lying on the upper surface of the puddle.

10. In apparatus for drying the puddled constituents of abrasive wheels and the like, a metallic plate, an absorbtive mat lying thereon, a ring lying on the mat, forming a mold into which the puddle is poured, and an absorbtive cover lying on the upper surface of the puddle.

11. In apparatus for drying the puddled constituents of abrasive wheels and the like, a square metallic plate, a square piece of asbestos board lying thereon, a circular ring lying upon the board, into which the puddle is poured, and a piece of asbestos board adapted to lie on the top of the puddle to protect the puddle from the direct action of the surrounding air.

12. In apparatus for drying the puddled constituents of abrasive wheels and the like, a pallet, a ring lying thereon in which to mold the puddle, and a compressible lining in the ring, having sufficient stability to withstand the pressure of the puddle when it is poured into the ring and while the puddle is drying, but which may be compressed by jarring or shaking the ring slightly after the puddle is dry, allowing the ring to be easily removed from the puddle.

13. In apparatus for drying the puddled constituents of abrasive wheels and the like, means for entirely investing the puddle, part of said investment giving form to the puddle and part of it being adapted to absorb water from the puddle and expose the water to evaporation.

14. In apparatus for drying the puddled constituents of abrasive wheels and the like, means for entirely investing the puddle, part of said investment giving form thereto and part of it being adapted to absorb water therefrom and expose the water to evaporation; an oven for drying the invested puddle, means for circulating the air in said oven horizontally without admitting any fresh air, and means for admitting fresh air when desirable while continuing the horizontal circulation of air.

15. The method of making a puddled ceramic article which comprises completely investing the article in an absorbtive media while it is dried.

16. The method of making a puddled ceramic article which comprises investing the article, part of the investment giving form to the article and part of it being adapted to conduct water from the article by capilarity.

EDWARD ANDERSON